(12) United States Patent
Zhang et al.

(10) Patent No.: US 12,201,906 B2
(45) Date of Patent: Jan. 21, 2025

(54) COMBAT CONTROL METHOD FOR GAME OBJECT, COMPUTER READABLE STORAGE MEDIUM, AND INTELLIGENT TERMINAL

(71) Applicant: Shanghai Lilith Network Technology Company Limited, Shanghai (CN)

(72) Inventors: Yu Zhang, Shanghai (CN); Pengfei Li, Shanghai (CN); Xin Wan, Shanghai (CN); Yikun Guo, Shanghai (CN)

(73) Assignee: Shanghai Lilith Network Technology Company Limited, Shanghai (CN)

( * ) Notice: Subject to any disclaimer, the term of this patent is extended or adjusted under 35 U.S.C. 154(b) by 263 days.

(21) Appl. No.: 17/907,945

(22) PCT Filed: May 28, 2021

(86) PCT No.: PCT/CN2021/096670
§ 371 (c)(1),
(2) Date: Aug. 29, 2022

(87) PCT Pub. No.: WO2022/156106
PCT Pub. Date: Jul. 28, 2022

(65) Prior Publication Data
US 2023/0093624 A1    Mar. 23, 2023

(30) Foreign Application Priority Data
Jan. 20, 2021    (CN) .......................... 202110073825.6

(51) Int. Cl.
*A63F 13/56*    (2014.01)

(52) U.S. Cl.
CPC ...... *A63F 13/56* (2014.09); *A63F 2300/6607* (2013.01)

(58) Field of Classification Search
CPC .......... A63F 13/55; A63F 13/56; A63F 13/58; A63F 13/216; A63F 13/219; A63F 13/426; A63F 13/822; A63F 2300/807
See application file for complete search history.

(56) References Cited

U.S. PATENT DOCUMENTS 3,514,110 A * 5/1970 Thomander ......... A63F 3/00075
273/265
3,697,076 A * 10/1972 Vogel ................. A63F 3/00643
273/238

(Continued)

FOREIGN PATENT DOCUMENTS

CN    106919790    7/2017
CN    109814955    5/2019

(Continued)

*Primary Examiner* — David L Lewis
*Assistant Examiner* — Matthew D Hoel
(74) *Attorney, Agent, or Firm* — David R. Stevens; Stevens Law Group

(57) ABSTRACT

A combat control method for a game object, a computer readable storage medium, and an intelligent terminal are provided. The combat control method includes: configuring a game object, where the game object includes first game units and second game units; configuring an arrangement area for the game object, where the arrangement area has n accommodation units for accommodating each game object in a horizontal direction, and m accommodation units for accommodating each game object in a vertical direction; obtaining a first arrangement column by separating along the vertical direction in the arrangement area, and placing the first game units in the first arrangement column; and obtaining second arrangement columns by separating along the vertical direction in the arrangement area that do not overlap the first arrangement column, and placing the second game units in second arrangement columns to form a combat lineup.

10 Claims, 2 Drawing Sheets

(56) References Cited

U.S. PATENT DOCUMENTS

| | | | | |
|---|---|---|---|---|
| 3,734,507 | A * | 5/1973 | Hillman | A63F 3/00643 273/237 |
| 3,887,189 | A * | 6/1975 | Dawes | A63F 3/00643 273/272 |
| 3,947,039 | A * | 3/1976 | Sadler | A63F 3/00041 273/247 |
| 3,995,704 | A * | 12/1976 | Blickman | A63F 3/0023 273/285 |
| 4,018,445 | A * | 4/1977 | Anania, Sr. | A63F 3/0415 273/153 R |
| RE29,355 | E * | 8/1977 | Lefevre | A63F 3/00072 273/256 |
| 4,046,382 | A * | 9/1977 | Ratzkoff | A63F 3/0423 273/269 |
| 4,052,069 | A * | 10/1977 | Sandhu | A63F 3/02 273/261 |
| 4,093,237 | A * | 6/1978 | Weiss | A63F 3/00895 273/260 |
| 4,131,283 | A * | 12/1978 | Havlik | A63F 3/02 273/287 |
| 4,136,880 | A * | 1/1979 | Rikon | A63F 3/00176 273/261 |
| 4,193,602 | A * | 3/1980 | Eliot | A63F 3/00 273/288 |
| 4,194,741 | A * | 3/1980 | Rea | A63F 3/00006 273/243 |
| 4,221,389 | A * | 9/1980 | Read | A63F 3/00075 273/262 |
| 4,468,036 | A * | 8/1984 | Istrati | A63F 9/0803 273/271 |
| 4,783,081 | A * | 11/1988 | Eckhardt | A63F 3/00261 273/284 |
| 4,815,745 | A * | 3/1989 | Alvarez, Jr. | A63F 3/00041 273/259 |
| 5,301,952 | A * | 4/1994 | Fitzgerald | A63F 3/00 273/269 |
| 5,577,727 | A * | 11/1996 | Brame | A63F 3/0645 273/148 R |
| 6,250,633 | B1 * | 6/2001 | Mohtasham | A63F 3/02 273/287 |
| 7,717,428 | B2 * | 5/2010 | Turner, Sr. | A63F 3/00176 273/261 |
| 8,079,592 | B1 * | 12/2011 | Butler | A63F 3/0415 463/31 |
| 8,821,245 | B2 * | 9/2014 | Massioli | G07F 17/3244 463/16 |
| 8,827,788 | B2 * | 9/2014 | Takagi | A63F 13/35 463/9 |
| 9,498,719 | B2 * | 11/2016 | Takeuchi | A63F 13/58 |
| 9,901,817 | B2 * | 2/2018 | Yamaguchi | A63F 13/42 |
| 10,335,689 | B2 * | 7/2019 | Wada | A63F 13/537 |
| 10,737,173 | B2 * | 8/2020 | Fukuda | A63F 13/69 |
| 10,960,305 | B2 * | 3/2021 | Hisaoka | A63F 13/35 |
| 11,628,361 | B2 * | 4/2023 | Eda | A63F 13/31 463/31 |
| 11,992,766 | B2 * | 5/2024 | Saito | A63F 13/812 |
| 2003/0027615 | A1 * | 2/2003 | Sousumi | A63F 3/00643 463/14 |
| 2004/0090002 | A1 * | 5/2004 | Venegas, Jr. | A63F 3/00075 273/255 |
| 2005/0012272 | A1 * | 1/2005 | Yu | A63F 3/02 273/243 |
| 2006/0010256 | A1 * | 1/2006 | Heron | A63F 13/12 710/1 |
| 2007/0026944 | A1 * | 2/2007 | Maehiro | A63F 13/45 463/31 |
| 2007/0213107 | A1 * | 9/2007 | Itou | A63F 13/56 463/1 |
| 2009/0278310 | A1 * | 11/2009 | Bower | A63F 3/0415 273/242 |
| 2011/0281623 | A1 * | 11/2011 | Tackett | A63F 3/0415 463/43 |
| 2013/0184040 | A1 * | 7/2013 | Nonaka | A63F 13/35 463/7 |
| 2013/0231167 | A1 * | 9/2013 | Patnoe | A63F 3/0423 273/272 |
| 2014/0066199 | A1 * | 3/2014 | Takagi | A63F 13/53 463/31 |
| 2014/0073416 | A1 * | 3/2014 | Toyama | G07F 17/3251 463/25 |
| 2014/0135119 | A1 * | 5/2014 | Yamada | A63F 13/00 463/31 |
| 2015/0031425 | A1 * | 1/2015 | Higo | A63F 13/42 463/9 |
| 2015/0231499 | A1 * | 8/2015 | Mizukami | A63F 13/35 463/31 |
| 2017/0136357 | A1 * | 5/2017 | Moon | A63F 3/00643 |
| 2017/0361232 | A1 * | 12/2017 | Maietti | A63F 13/58 |
| 2020/0078662 | A1 * | 3/2020 | Simmons | A63F 3/00176 |
| 2020/0101370 | A1 * | 4/2020 | Shivers | A63F 3/02 |
| 2020/0139247 | A1 * | 5/2020 | Shigeta | A63F 13/795 |
| 2020/0276493 | A1 * | 9/2020 | Petering | A63F 9/0641 |
| 2020/0316467 | A1 * | 10/2020 | Matsushita | A63F 13/537 |
| 2022/0080315 | A1 * | 3/2022 | Knutsson | A63F 13/537 |
| 2023/0330539 | A1 * | 10/2023 | Gao | A63F 13/533 |

FOREIGN PATENT DOCUMENTS

| | | |
|---|---|---|
| CN | 111617478 | 9/2020 |
| CN | 112717398 | 4/2021 |
| JP | 2018057742 | 4/2018 |
| JP | 2020039983 | 3/2020 |

* cited by examiner

COMBAT CONTROL METHOD FOR GAME OBJECT, COMPUTER READABLE STORAGE MEDIUM, AND INTELLIGENT TERMINAL

TECHNICAL FIELD

The present disclosure relates to a field of game control, and in particular, to a combat control method for a game object, a computer readable storage medium, and an intelligent terminal.

BACKGROUND

With rapid development of an intelligent terminal, it is becoming more common for users to use the intelligent terminal to perform various operations. It is especially common to use the intelligent terminal to play games. Taking SLG (simulation game) as an example, a player needs to deploy his own heroes and soldiers to experience strategic attributes of the simulation game before engaging in game battles.

When troops are deployed to form an array, for different attributes and characteristics of different types of soldiers in the game, a size of the troops, that is, a number of rectangular grids occupied by the troops may vary. When each of heroes or soldiers is joined the game, the each of heroes or troops is arranged in an order according to default array priority until the rectangular grids are occupied. For example, in order to deploy the soldiers as close to a center position as possible, the soldiers may be deployed in the center position with priority until there is no place for deploying new soldiers. However, because most of the troops are long-striped, and the rectangular grids occupied by different types of troops are inconsistent, the troops cannot be deployed in a reasonable way, leading to unreasonable use of space. When there are a large number of troops and heroes, there are vacancies in a deployment space, but the positions of heroes or soldiers cannot be adjusted if the existing soldiers already in the array are not moved. For the game player, battle experience is not good and time of the player is wasted.

Therefore, a new method of combat control for a game object is needed to configure a lineup of the game object within the game application program in a quick and automatic way, in order to utilize the deployment space with maximum efficiency.

SUMMARY

In order to overcome the above technical deficiencies, some embodiments of the present disclosure provide a combat control method for a game object, a computer readable storage medium, and an intelligent terminal, which makes full use of deployment space and can quickly help a game player to configure the game object and improve game experience.

The present disclosure discloses a combat control method for a game object, including the following steps: configuring at least one game object, where the at least one game object comprises a first game units and b second game units, where a size of a first game unit is p*p, each second game unit comprises c operation units, and a size of the each second game unit is x*y; configuring an arrangement area for the at least one game object, where the arrangement area has n accommodation units for accommodating the at least one game object in a horizontal direction, and m accommodation units for accommodating the at least one game object in a vertical direction, so that a size of the arrangement area is m*n; obtaining a first arrangement column of horizontal dimension p by separating along the vertical direction in the arrangement area, and placing the first game units in the first arrangement column, where a distance between an edge of the first arrangement column along the vertical direction and a closest edge of the arrangement area along the vertical direction z≥x; and obtaining b second arrangement columns of horizontal dimension x by separating along the vertical direction in the arrangement area, and placing the each second game unit in the second arrangement columns to form a combat lineup, where the second arrangement columns do not overlap the first arrangement column, where a, b, c, p, x, y, m, n, z∈N*, and a*p≤m, b*y≤m.

In some embodiments, obtaining the first arrangement column of horizontal dimension p by separating along the vertical direction in the arrangement area, and placing the first game units in the first arrangement column includes: obtaining the first arrangement column of horizontal dimension p by separating along the vertical direction in the arrangement area; classifying the first game units into first attribute units and second attribute units according to an attribute type; placing one of the first attribute units in the first arrangement column along an orientation direction of the game object, and placing one of the second attribute units in the first arrangement column opposite to the orientation direction of the game object; placing another one of the first attribute units in the first arrangement column along the orientation direction of the game object, and pushing the one of the first attribute units to move along the orientation direction of the game object; and placing another one of the second attribute units in the first arrangement column opposite to the orientation direction of the game object, and pushing the one of the second attribute units to move opposite to the orientation direction of the game object, until the first attribute units and the second attribute units are all placed in the first arrangement column.

In some embodiments, obtaining b second arrangement columns of horizontal dimension x by separating along the vertical direction in the arrangement area, and placing the each second game unit in the second arrangement columns to form the combat lineup includes: obtaining b second arrangement columns of horizontal dimension x by separating along the vertical direction in the arrangement area, where the second arrangement columns do not overlap the first arrangement column; classifying the operation units into third attribute units and fourth attribute units according to an attribute type; placing one of the third attribute units in a second arrangement column along an orientation direction of the game object, and placing one of the fourth attribute units in the second arrangement column opposite to the orientation direction of the game object; placing another one of the third attribute units into the second arrangement column along the orientation direction of the game object, and pushing the one of the third attribute units to move along the orientation direction of the game object; and placing another one of the fourth attribute units in the second arrangement column opposite to the orientation direction of the game object, and pushing the one of the fourth attribute unit to move opposite to the orientation of the game object, until the third attribute units and the fourth attribute units are all placed in the second arrangement column.

In some embodiments, the distance between the edge of the first arrangement column along the vertical direction and the closest edge of the arrangement area along the vertical direction z=n−p−c*x; and the combat control method further includes: adjusting a position of the first game unit or a position of a second game unit in the arrangement area based on an operation instruction.

In some embodiments, adjusting the position of the first game unit or the position of the second game unit in the arrangement area based on the operation instruction includes: controlling the arrangement area to be in a locked state in an interaction interface of an application program running with the game object; receiving, by an intelligent terminal running the application program, the operation instruction, and determining a sliding start point and a sliding end point of the operation instruction on a screen of the intelligent terminal; moving a corresponding game object under a position of the sliding start point to a position of the sliding end point; and saving a final position of the game object based on a confirmation instruction.

In some embodiments, the method further includes: controlling, based on a combat process confirmation instruction, game objects comprising at least a game object in a first combat lineup and a game object in a second combat lineup to enter a combat state; controlling a first game object in the first combat lineup to point to a second game object in the second combat lineup to form a first combat group, and controlling a third game object in the first combat lineup to point to a fourth game object in the second combat lineup to form a second combat group, until each game object in the first combat lineup or in the second combat lineup is configured with a pointed game object; and calculating a combat result of each combat group, and pointing the game object with a winning combat result in the first combat lineup to the game object with a winning combat result in the second combat lineup, to form a secondary combat group, until the game objects in either the first combat lineup or the second combat lineup are all defeated.

In some embodiments, calculating the combat result of each combat group, and pointing the game object with the winning combat result in the first combat lineup to the game object with the winning combat result in the second combat lineup, to form the secondary combat group, until the game objects in either the first combat lineup or the second combat lineup are all defeated includes: calculating the combat result of each combat group; entering, by the game object with the winning combat result in the first combat lineup, a waiting state, until the game object with the winning combat result in the second combat lineup appears; and the combat control method further includes: adding new game objects to the first combat lineup or the second combat lineup based on a game object adjustment instruction.

In some embodiments, in response to a number of the game objects in the first combat lineup is greater than a number of the game objects in the second combat lineup, some of the game objects in the first combat lineup are controlled to be idle game objects; and in response to the game object with the winning combat result in the second combat lineup appears, one of the idle game objects is randomly selected or selected based on battle logic to point to the game object with the winning combat result in the second combat lineup.

The present disclosure further discloses a computer-readable storage medium having a computer program stored thereon, and the computer program is executed by the processor to perform any one of the above methods.

The present disclosure still further discloses an intelligent terminal, including a memory, a processor, and a computer program stored on the memory and running on the processor, and the computer program is executed by the processor to perform any one of the above methods.

With adoption of the above technical solution, the following beneficial effects are achieved compared to the related art.

1. When the game object in the game application program is arranged in a manner of automatic deployment, the game objects can be quickly arranged in best position, and space in the arrangement area of the lineup can be saved as much as possible.

2. During a lineup configuration, an operation of moving the game object is simpler, and a mis-operation can be reduced.

3. During a combat, combat time can be shortened, a game process can be speeded, thus improving the user experience.

DETAILED DESCRIPTION OF EMBODIMENTS

Figure 1:
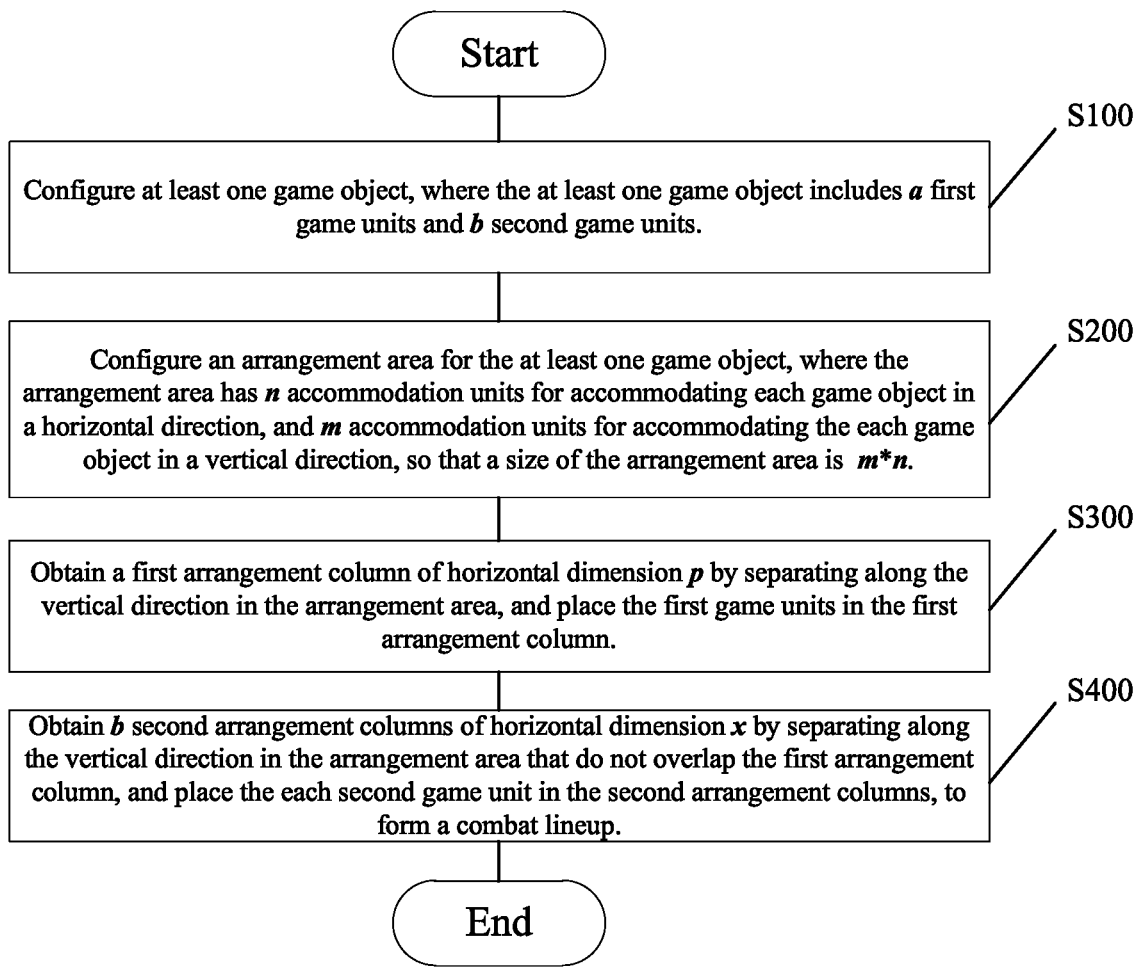
FIG. 1 is a schematic flowchart of a combat control method for a game object in accordance with the present disclosure.

Advantages of the present disclosure are described below in detail with reference to accompanying drawings and specific embodiments.

Exemplary embodiments are described in detail herein, and examples of the exemplary embodiments are illustrated in the accompanying drawings. Where the following description refers to the drawings, the same numerals in different drawings refer to the same or similar elements unless otherwise indicated. The implementations described in the exemplary embodiments below are not intended to represent all implementations consistent with the present disclosure. On the contrary, they are only examples of apparatuses and methods that are described in the appended claims in detail and that are consistent with some aspects of the present disclosure.

The terminology used in the present disclosure is for the purpose of describing particular embodiments only and is not intended to limit the present disclosure. The terms "a", "said", and "the" of singular forms used in the present disclosure and the appended claims are also intended to include plural forms, unless otherwise specified in the context clearly. It should further be understood that, the term "and/or" used herein indicates and includes any one or all of possible combinations of one or more associated listed items.

It should be understood that although terms "first", "second", "third" and the like may be used in the present disclosure to describe various information, the information is not limited by the terms. These terms are only used to differentiate information of a same type. For example, without departing from the scope of the present disclosure, first information may also be referred to as second information, and similarly the second information may also be referred to as the first information. Depending on the context, for example, words "if" used herein may be explained as "while" or "when" or "in response to determining."

In the descriptions of the present disclosure, it should be understood that, directions or positional relationships indicated by terms "vertical", "horizontal" "up", "down", "front", "back", "left", "right", "vertical", "horizontal", "top", "bottom", "inside", "outside", and the like are based on directions or positional relationships shown by the accompanying drawings, which are used only for describing the present disclosure and for description simplicity, but do not indicate or imply that an indicated apparatus or element must have a specific orientation or must be constructed and operated in a specific orientation. Therefore, this cannot be understood as a limitation on the present disclosure In the descriptions of the present disclosure, it should be noted that terms "installation" "joint", and "connection" should be understood in a broad sense unless there is a specific stipulation and limitation. For example, "connection" may be a mechanical connection or an electrical connection; and may be a connection inside two components, a direct connection, or an indirect connection through an intermediate medium. For persons of ordinary skill in the art, a specific meaning of the foregoing terms in the present disclosure may be understood according to a specific situation.

In the subsequent descriptions, a suffix such as "module", "component", or "unit" used to represent an element is merely used to facilitate description of the present disclosure, and does not have specific meanings. Therefore, the "module" and "component" may be interchanged with each other.

Referring to FIG. 1, FIG. 1 shows a combat control method for a game object in a game application program installed on and running in an intelligent terminal. The game objects may be heroes and different types of soldiers, such as infantry, cavalry, musketeers, and magicians, controlled by players in the game application program. In some embodiments, the process steps for the combat control method are as follows.

In S100, at least one game object is configured, where the at least one game object includes a first game units and b second game units.

The at least one game object may have different types of game objects. For example, when a game object is a hero, the hero may be a melee hero, such as a fighter, a warrior, an assassin, etc., or a long-range hero, such as an archer, a magicians, a gunmen, etc., When the game object is a soldier, the soldier may be an infantry, a cavalry, a musketeer, a magician etc., as described above. Therefore, in an example, the game object includes multiple first game units, which are heroes in this example, such as a first game units, and multiple second game units, which are corps in this example, such as b second game units.

When a lineup of the game object is configured in combat, the game object needs to be placed selectively. For a first game unit, a size of the first game unit may be p*p. Each second game unit includes c operation units. A size of the each second game unit is x*y. p, x, y are a number of grids occupied by the first game unit and the second game unit in a horizontal or vertical direction.

In S200, an arrangement area for the game object is configured, where the arrangement area has n accommodation units for accommodating each game object in a horizontal direction, and m accommodation units for accommodating each game object in a vertical direction, so that a size of the arrangement area is in m*n.

In the game application program, an interaction interface is presented, which shows the arrangement area indicating where and how the game objects may be arranged. For example, some game objects are arranged in front and some other game objects are arranged behind etc., in order to enrich player experience of a strategy game application program. The arrangement area is rectangular in shape, with n accommodation units in the horizontal direction and m accommodation units in the vertical direction, thus having an m*n architecture for the size of the arrangement area. Each accommodation unit may be the smallest grid in the arrangement area, and the game object may occupy one or more grids in order to be accommodated in the arrangement area. It is understood that, in order to place more first game units and more second game units, n and m may be greater than or much greater than p, x, and y, so that multiple first game units and multiple second game units may be placed in the horizontal direction or the vertical direction. For example, the arrangement area may be 7*5 in size, while the first game unit may be 2*2 in size, and the second game unit may be 2*3 in size.

In S300, a first arrangement column of horizontal dimension p is separated along the vertical direction in the arrangement area, and the first game unit is arranged in the first arrangement column, where a distance between an edge of the first arrangement column along the vertical direction and a closet edge of the first arrangement column z is not smaller than x, that is z≥x.

The first game unit and the second game unit may be placed sequentially into the arrangement area as required. Specifically, the first game unit, such as a hero, is assigned a higher priority and is placed in the arrangement area first. For the first game unit, the first arrangement column of horizontal dimension p is separated along the vertical direction in the arrangement area. Being separated in this example does not refer to a configuration that the first arrangement column is removed from the arrangement area and is separated from other parts of the arrangement area, but rather a configuration in which multiple consecutive columns of horizontal width p in the arrangement area are selected and combined to form the first arrangement column, preferably with the first arrangement column being highlighted or indicated without a mark. After the first arrangement column is determined, the first game unit may be placed in the first arrangement column. That is, when a number of the first game units is large, the first game unit are aligned and arranged in the vertical direction to save space in the arrangement area and prevent wasting space in a staggered arrangement.

In some embodiments, the edge of the first arrangement column along the vertical direction specifically refers to a vertical boundary, and a distance between the edge of the first arrange column along the vertical direction and the closet edge of the arrangement area along the vertical direction z is not smaller than x, that is z≥x. In this way, when the second game unit is subsequently arranged, multiple second game units may still be placed in the space between the edge of first arrangement column along the vertical direction and the edge of the arrangement area along the vertical direction, so that space is further saved.

In S400, b second arrangement columns of horizontal dimension x are separated along the vertical direction in the arrangement area that do not overlap the first arrangement column, and each second game unit is placed in the second arrangement column to form a combat lineup.

After the first game units are placed, the second arrangement columns continue to be separated in the arrangement area along the vertical direction. The second arrangement columns are configured as a space for placing the second game units. Therefore, the second arrangement columns do not overlap the first arrangement column. That is, for vertical columns other than the first arrangement column in the arrangement area, multiple, in particular, b second arrangement columns of dimension x are separated, so that all the second game units may be placed in the second arrangement columns. It may be understood that, when placing the second game unit, since there is more than one second arrangement column, the operation units may be randomly placed, or the operation units belonging to a same second game unit may be placed in a same column. Finally, a placement of the first game units and the second game units together form a combat lineup as required in a combat.

In any of the above embodiments, a, b, c, p, x, y, m, n, z∈N*, so that the first game unit and the second game unit may not occupy all the accommodation units, and a*p≤m, b*y≤m. Thus, according to a pre-battle arrangement control method in these embodiments, the arrangement area is just filled in the vertical direction, or one or two columns of unoccupied accommodation units are left for subsequent adjustment of the first game unit and the second game unit.

Taking a=3, b=4, p=2, c=12, x=6, y=2, n=21, m=10 as an example, that is, the game objects in this example includes three first game units such as heroes and four second game units such as corps, a size of the hero is 2*2, and the corps includes 12 operation units such as soldiers, so that a size of the corps is 6*2. When the game objects need to be arranged in an arrangement area of 21*10, a first arrangement column with horizontal dimension of 2 grids may be separated in the vertical direction, the heroes may be placed in the first arrangement column from top to bottom or from bottom to top. A distance between the edge of the first arrangement column along the vertical direction and the closet edge of the arrangement area z is not smaller than 6, that is, z≥6. Afterwards, four second arrangement columns with horizontal dimension of 6 grids, which do not overlap the first arrangement column, may be separated in the vertical direction. A combat lineup may be formed after the corps are placed in the second arrangement column. It may be understood that, the corps may be arranged close to the heroes, and the corps may be placed side by side in the vertical direction. That is, a number of laid out second arrangement column may be 3 or 2.

Figure 2:
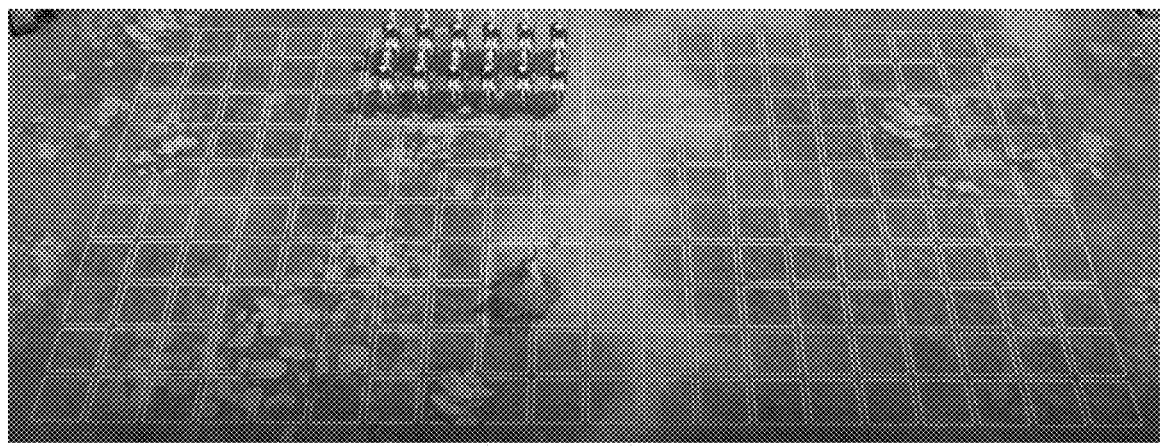
FIG. 2 is a schematic diagram of arrangement of the game object in accordance with the present disclosure.

Referring to FIG. 2 after adopting the above technical solution, when the game player is experiencing the game application program and needs to arrange the game objects under his control, the game objects may be placed automatically in the game application program if an automatic deployment function is adopted. The game objects such as the heroes and the soldiers are placed according to the size of the arrangement area, in which a placement position may be closest to a desired placement of the game player. On one hand, the arrangement area may be highly utilized. On the other hand, the first game units may be centralized in the center to meet needs of the game player.

In some embodiments, S300 specifically includes steps as follows.

In S310, a first arrangement column of horizontal dimension p may be separated along the vertical direction in the arrangement area.

In S320, the first game units may be classified into first attribute units and second attribute units according to an attribute type.

The first game units may be classified into the first attribute units and the second attribute units, third attribute units, or more types. In some embodiments, for example, the first game units may be classified according to different types of heroes, such as a melee hero and a long-range hero.

In S330, one of the first attribute units may be placed in the first arrangement column along an orientation direction of the game object, and one of the second attribute units may be placed in the first arrangement column opposite to the orientation direction of the game object.

Positions of some game units in the game application program may be limited. For example, the melee hero may be placed in the front and the long-range hero may be placed in the back. Therefore, a process of placing the first game units with different attributes may be different, that is, the first attribute unit may be placed in the first arrangement column along the orientation direction of the game object, and the second attribute unit may be placed in the first arrangement column opposite to the orientation direction of the game object, so that the melee hero may be preferentially arranged in the front, and the long-range hero may be preferentially arranged in the back.

In S340, another first attribute unit may be placed in the first arrangement column along the orientation direction of the game object, and the one of the first attribute units is pushed to move along the orientation direction of the game object.

When another long-range hero needs to be placed in the first arrangement column, that is, when placing another first attribute unit in the first arrangement column along the orientation direction of the game object, the another first attribute unit that subsequently enters the first arrangement column pushes a previous one of the first attribute units to move along the orientation direction of the game object, since the previous one of the first attribute units has been placed in the first arrangement column. The first attribute units of a same type may be continuously arranged, for example by using a floating method.

In S350, another second attribute unit may be placed in the first arrangement column opposite to the orientation of the game object, and the one of the second attribute units may be pushed to move opposite to the orientation of the game object, until first attribute units and second attribute units are all arranged in the first arrangement column.

When another melee hero needs to be placed in the first arrangement column, that is, when placing another second attribute unit in the first arrangement column opposite to the orientation of the game object, the another second attribute unit that subsequently enters the first arrangement column pushes a previous one of the second attribute units to move opposite to the orientation of the game object, since the previous one of the second attribute units has been placed in the first arrangement column. That is, the previous second attribute units are gradually pushed backwards. The second attribute units of a same type may be continuously arranged, for example by using a sinking method.

In some embodiments, S400 specifically includes steps as follows.

In S410, b second arrangement columns of horizontal dimension x may be separated along the vertical direction in the arrangement area that do not overlap the first arrangement column.

In S420, the operation units may be classified into third attribute units and fourth attribute units according to the attribute type.

The operation units may be classified into the third attribute units and the fourth attribute units, or more types. In some embodiments, for example, the operation units or the second game units may be classified according to different types of soldiers, such as a melee soldier and a long-range soldier.

In S430, one of the third attribute units may be placed in the second arrangement column along the orientation direction of the game object, and one of the fourth attribute units may be placed in the second arrangement column opposite to the orientation direction of the game object.

Positions of some game units in the game application program may be limited. For example, the melee soldier may be placed in the front, and the long-range soldier may be placed in the back. Therefore, a process of placing the second game units with different attributes may be different, that is, the third attribute unit may be arranged in the second arrangement column along the orientation direction of the game objects, and the fourth attribute unit may be arranged in the second arrangement column opposite to the orientation direction of the game object, so that the melee soldier may be preferentially arranged in the front, and the long-range soldier may be preferentially arranged in the back.

In S440, another third attribute unit may be placed in the second arrangement column along the orientation direction of the game object, and the one of the third attribute units is pushed to move along the orientation direction of the game object.

When another long-range soldier needs to be placed in the second arrangement column, that is, when placing another third attribute unit in the second arrangement column along the orientation direction of the game object, the another third attribute unit that subsequently enters the second arrangement column pushes a previous one of the third attribute units to move along the orientation direction of the game object, since the previous one of the third attribute units has been placed in the second arrangement column. The third attribute units of a same type are continuously arranged, for example by using the floating method.

In S450, another fourth attribute unit may be placed in the second arrangement column opposite to the orientation of the game object, and the one of the fourth attribute units may be pushed to move opposite to the orientation of the game object, until third attribute units and fourth attribute units are all arranged in the second arrangement column.

When another melee soldier needs to be placed in the second arrangement column, that is, when placing another fourth attribute unit in the second arrangement column opposite to the orientation of the game object, the another fourth attribute unit that sequentially enters the second arrangement column pushes a previous one of the fourth attribute units to move opposite to the orientation of the game object, since the previous one to the fourth attributes has been placed in the second arrangement column. That is, the previous fourth attribute units may be gradually pushed backwards. The fourth attribute units of a same type may be continuously arranged, for example by using the sinking method.

In some embodiments, the distance between the edge of the first arrangement column along the vertical direction and the closet edge of the arrangement area $z=n-p-c*x$. Therefore, a horizontal length n of the arrangement area may be greater than or equal to $(c+1)*x+p$. Further, the combat control method further includes steps as follows.

In S500, a position of the first game units or the second game units may be adjusted in the arrangement area based on an operation instruction.

After an automatic deployment, the game player may be also provided with an interface for manual adjustment in the game application program. The game player may send an operation instruction to the intelligent terminal. Based on the operation instruction, the position of the first game units or the second game units in the arrangement area may be accordingly adjusted. Final positions of the first game units and the second game units may be determined after the adjustment.

In some embodiments, S500 includes steps as follows.

In S510, the arrangement area may be controlled in a locked state in an interaction interface of an application running with the game object.

The interaction interface of the intelligent terminal running the game application program may be in a locked state. Generally speaking, when the game player inputs instructions to the interaction interface, he needs to input two instructions. A first instruction may be to select a game object that he expects to move. For example, select by tapping, so as to distinguish from that the intelligent terminal recognizes the instruction as sliding on the interaction interface, or switching the camera, etc. A second instruction may be to move the game object. In this example, the interaction interface may be adjusted to a wide angle, that is, the arrangement area and all the game objects may be displayed on the interaction interface. In addition, the interaction interface may be controlled to be in the locked state. A user's operation on the interaction interface may not be recognized as an operation of dragging a viewpoint.

In S520, the intelligent terminal running the application program may receive the operation instruction, and determine a sliding start point and a sliding end point of the operation instruction on a screen of the intelligent terminal.

In the locked state, a sliding of the user on the intelligent terminal may be recognized as an operation instruction pointing to the intelligent terminal running the application program, and the sliding start point and the sliding end point of the operation instruction on the screen of the intelligent terminal may be recognized. If the operation instruction is tapping or double-tapping, the sliding start point and the sliding end point may be at a same position.

In S530, a corresponding game object under a position of the sliding start point may be moved to a position of the sliding end point.

This operation instruction may correspond directly to an adjustment of the game object. Therefore, the game object may be moved to a position corresponding to the sliding end point. This operation instruction may not be recognized as an adjustment of the viewpoint or a dragging of the interaction interface.

In S540, a final position of the game object may be saved based on a confirmation instruction.

In some embodiments, the combat control method may further include a control method in a combat. The control method may specifically include steps as follows.

In S600, the game objects including at least game objects in a first combat lineup and game objects in a second combat lineup may be controlled to enter a combat state, based on a confirmation instruction in combat process.

Based on the combat process confirmation instruction formed by the user's confirmation of the lineup, the game objects in a lineup of one game player and the game objects in a lineup of the other game player may be configured to fight with each other. That is, the lineup of the one game player may be the first combat lineup, while the lineup of the other game player may be the second combat lineup, where all game objects may enter a state of fighting with each other.

In S700, a first game object in the first combat lineup may be controlled to point to a second game object in the second combat lineup to form a first combat group, and a third game object in the first combat lineup may be controlled to point to a fourth game object in the second combat lineup to form a second combat group, until each game object in the first combat lineup or in the second combat lineup may be configured with a pointed game object.

All game objects that are available for battle in the first combat lineup may be grouped. For example, the first combat lineup may include units in groups A, B, C, D, and E. The units in group A may be defined as the first game object, and so on. Likewise, the game objects available for battle in the second combat lineup may be all grouped. For example, the second combat lineup may include units in groups F, G, and H. After a grouping is completed, combat pointing may be configured for each game object in a one-to-one correspondence manner. That is, the first game object may point to the second game object in the second combat lineup to form the first combat group, and the third game object in the first combat lineup may point to the fourth game object in the second combat lineup to form the second combat group. For example, group A may point to group F, group B may point to group G, and group C may point to group H. In this case, all the second game objects of the second combat lineup may have respective battle targets, and the combat pointing may be over.

In S800, a combat result of each combat group may be calculated, and the game object with a winning combat result in the first combat lineup may be pointed to the game object with a winning combat result in the second combat lineup to form a secondary combat group, until all game objects in either the first combat lineup or the second combat lineup are defeated.

The combat result of each combat group may be calculated, such as, which game objects in the first combat lineup won and which game objects in the first combat lineup lose. For the game object in the first combat lineup with a winning combat result, a second round of battle may be carried out. That is, the game object in the first combat lineup with the winning combat result may point to the game object in the second combat lineup with the winning combat result, to form the secondary combat group, and the combat may continue. And so on until all game objects in either the first combat lineup or the second combat lineup are defeated. Through the above configuration, there is no need to wait for a previous combat group to complete the combat before starting a next combat group, compressing combat execution time by combat in parallel. Further, S800 specifically includes steps as follows.

In S810, a combat result of each combat group may be calculated, and the game object with the winning combat result in the first combat lineup may enter a waiting state, until the game object with the winning combat result in the second combat lineup appears.

If a combat result and battle performance of one combat group has ended, and a game object in the first combat lineup won, and a combat result or battle performance of other combat groups has not ended, or the combat result or battle performance of the other combat groups has ended, but the game object in the first combat lineup won, the game object has won may have no game object in the second combat lineup to point. In this regard, the game object with the winning combat result in the first combat lineup may be controlled to enter the waiting state, until the game object with the winning combat result in the second combat lineup appears.

Preferably or optionally, the combat control method further includes steps as follows.

In S900, a new game object may be added to the first combat lineup or the second combat lineup based on a game object adjustment instruction.

During the combat, in order to enrich a strategy, the game player may apply, to the intelligent terminal, an instruction of adjusting the number of game objects, and add the new game object to the first combat lineup or the second combat lineup, until the game objects in a certain combat lineup are all defeated.

Preferably or optionally, when a number of game objects in the first combat lineup is greater than a number of game objects in the second combat lineup, since some game objects in the first combat lineup may not have combat pointing, these game objects may be controlled to be idle game objects. When the game object with the winning combat result in the second combat lineup appears, one of the idle game objects may be randomly selected or selected based on battle logic, such as a game object with high battle power or a game object with a larger number of remaining soldiers, to point to the game object with the winning combat result in the second combat lineup.

In any of the above embodiments, when the combat is multi-party, all game objects that are not of one party may be selected to match game objects of the one party to fight, in a parallel pointing and fight manner. A matching order may correspond to an order of entering a combat state. In addition, a number of combat groups may not have an upper limit. For a game player having many game objects, the game player may also be matched with another game player according to the combat control method of embodiments of the present disclosure.

The present disclosure further discloses a computer readable storage medium on which a computer program is stored, and when the computer program is executed by a processor, the above steps are implemented.

The present disclosure further discloses an intelligent terminal, including a memory, a processor, and a computer program stored in the memory and running on the processor, and when the computer program is executed by the processor, the above steps are implemented.

The intelligent terminal may be implemented in various forms. For example, the terminal described in the embodiments of the present disclosure may be an intelligent terminal such as a mobile phone, a smartphone, a notebook computer, a PDA (personal digital assistant), a PAD (tablet computer), a PMP (portable multimedia player), a navigation apparatus, and a fixed terminal such as a digital TV and a desktop computer. It is assumed that the terminal is an intelligent terminal below. However, persons skilled in the art may understand that a configuration according to the embodiments of the present disclosure may also be applied to fixed-type terminals, in addition to elements especially for movement.

It should be noted that the embodiments of the present disclosure have better practicability, and do not limit the present disclosure in any form. Any person skilled in the art may use technical contents disclosed above to change or modify into equivalent effective embodiments. However, any modifications or equivalent changes and modifications made to the above embodiments according to a technical essence of the present disclosure, without departing from a content of a technical solution of the present disclosure, still fall within a scope of the technical solution of the present disclosure.

What is claimed is:

1. A combat control method for a game object, comprising:
configuring at least one game object in a computer-controlled video game that includes a two-dimensional array of grids rendered on a video display terminal by a processing system that includes at least one processor and one or more non-transitory memory elements, the two-dimensional array being associated with a horizontal direction and a vertical direction as rendered on the video display terminal, wherein the at least one game object is rendered on the video display terminal, wherein the at least one game object comprises a first game units and b second game units, wherein a game unit is a character in the video game, wherein a first game unit occupies a first two-dimensional region in the array spanning p grids in the horizontal direction and p grids in the vertical direction, each second game unit comprises c operation units, wherein an operation unit comprises one or more game characters dedicated to a specific set of functions in the game, and wherein the second game unit occupies a second two-dimensional region in the array spanning x grids in the horizontal direction or the vertical direction, and y grids in the vertical direction or horizontal direction, respectively;

configuring an arrangement area for the at least one game object to be rendered on the two-dimensional array on the video display terminal by the processing system, wherein the arrangement area has n accommodation units for accommodating the at least one game object in the horizontal direction, and m accommodation units for accommodating the at least one game object in the vertical direction, so that a size of the arrangement area is m units in the vertical direction and n units in the horizontal direction, wherein an accommodation unit is a group of one or more grids in the game, the group of grids being configured to accommodate or situate the at least one game object to be rendered on the video display terminal by the processing system;

obtaining a first arrangement column of horizontal dimension p grids by separating along the vertical direction in the arrangement area, and placing the first game units in the first arrangement column as rendered on the video display terminal by the processing system, wherein a distance between an edge of the first arrangement column along the vertical direction and a closest edge of the arrangement area along the vertical direction is measured in grids and denoted by z, wherein z≥x; and obtaining b second arrangement columns of horizontal dimension x grids by separating along the vertical direction in the arrangement area, and placing the each second game unit in the second arrangement columns to form a combat lineup as rendered on the video display terminal by the processing system, wherein the second arrangement columns do not overlap the first arrangement column, wherein a, b, c, p, x, y, m, n are integer values, and a×p≤m, b×y≤n.

2. The combat control method according to claim 1, wherein obtaining the first arrangement column of horizontal dimension p by separating along the vertical direction in the arrangement area, and placing the first game units in the first arrangement column comprises:

obtaining the first arrangement column of horizontal dimension p by separating along the vertical direction in the arrangement area;

classifying the first game units into first attribute units and second attribute units according to an attribute type;

placing one of the first attribute units in the first arrangement column along an orientation direction of the game object, and placing one of the second attribute units in the first arrangement column opposite to the orientation direction of the game object;

placing another one of the first attribute units in the first arrangement column along the orientation direction of the game object, and pushing the one of the first attribute units to move along the orientation direction of the game object; and placing another one of the second attribute units in the first arrangement column opposite to the orientation direction of the game object, and pushing the one of the second attribute units to move opposite to the orientation direction of the game object, until the first attribute units and the second attribute units are all placed in the first arrangement column.

3. The combat control method according to claim 1, wherein obtaining b second arrangement columns of horizontal dimension x by separating along the vertical direction in the arrangement area, and placing the each second game unit in the second arrangement columns to form the combat lineup comprises:

obtaining b second arrangement columns of horizontal dimension x by separating along the vertical direction in the arrangement area, wherein the second arrangement columns do not overlap the first arrangement column;

classifying the operation units into third attribute units and fourth attribute units according to an attribute type;

placing one of the third attribute units in a second arrangement column along an orientation direction of the game object, and placing one of the fourth attribute units in the second arrangement column opposite to the orientation direction of the game object;

placing another one of the third attribute units into the second arrangement column along the orientation direction of the game object, and pushing the one of the third attribute units to move along the orientation direction of the game object; and placing another one of the fourth attribute units in the second arrangement column opposite to the orientation direction of the game object, and pushing the one of the fourth attribute units to move opposite to the orientation of the game object, until the third attribute units and the fourth attribute units are all placed in the second arrangement column.

4. The combat control method according to claim 1, wherein the distance between the edge of the first arrangement column along the vertical direction and the closest edge of the arrangement area along the vertical direction $z=n-p-(c \times x)$; and the combat control method further comprises:

adjusting a position of the first game unit or a position of a second game unit in the arrangement area based on an operation instruction.

5. The combat control method according to claim 4, wherein adjusting the position of the first game unit or the position of the second game unit in the arrangement area based on the operation instruction comprises:

controlling the arrangement area to be in a locked state in an interaction interface rendered on the video display terminal of an application program running on the processing system with the game object;

receiving, by the processing system running the application program, the operation instruction, and determining a sliding start point and a sliding end point of the operation instruction as rendered by the processing system on the video display monitor;

moving a corresponding game object under a position of the sliding start point to a position of the sliding end point; and saving a final position of the game object based on a confirmation instruction.

6. The combat control method according to claim 1, further comprising:

controlling, based on a combat process confirmation instruction, game objects comprising at least a game object in a first combat lineup and a game object in a second combat lineup to enter a combat state;

controlling a first game object in the first combat lineup to point to a second game object in the second combat lineup to form a first combat group, and controlling a third game object in the first combat lineup to point to a fourth game object in the second combat lineup to form a second combat group, until each game object in the first combat lineup or in the second combat lineup is configured with a pointed game object; and calculating a combat result of each combat group, and pointing the game object with a winning combat result in the first combat lineup to the game object with a winning combat result in the second combat lineup, to form a secondary combat group, until the game objects in either the first combat lineup or the second combat lineup are all defeated.

7. The combat control method according to claim 6, wherein calculating the combat result of each combat group, and pointing the game object with the winning combat result in the first combat lineup to the game object with the winning combat result in the second combat lineup, to form the secondary combat group, until the game objects in either the first combat lineup or the second combat lineup are all defeated comprises:

calculating the combat result of each combat group;

entering, by the game object with the winning combat result in the first combat lineup, a waiting state, until the game object with the winning combat result in the second combat lineup appears; and the combat control method further comprises:

adding new game objects to the first combat lineup or the second combat lineup based on a game object adjustment instruction.

8. The combat control method according to claim 6, wherein in response to a number of the game objects in the first combat lineup is greater than a number of the game objects in the second combat lineup, some of the game objects in the first combat lineup are controlled to be idle game objects; and in response to the game object with the winning combat result in the second combat lineup appears, one of the idle game objects is randomly selected or selected based on battle logic to point to the game object with the winning combat result in the second combat lineup.

9. A computer-readable storage medium having a computer program stored thereon, wherein the computer program is executed by the processor to perform the method of claim 1.

10. An intelligent terminal, comprising the processing system and the video display terminal and a computer program stored in the memory and running on the processor, wherein the computer program is executed by the processor to perform the method of claim 1.

* * * * *